(12) United States Patent
Stokey et al.

(10) Patent No.: US 7,131,799 B2
(45) Date of Patent: Nov. 7, 2006

(54) CUTTING INSERT WITH HELICAL GEOMETRY AND HOLDER THEREFOR

(75) Inventors: Steven R. Stokey, Dover, OH (US); Martin Alan Jackson, Canton, OH (US); Joseph P. Nuzzi, Dover, OH (US); Wendell E. Mast, Dundee, OH (US)

(73) Assignee: Allied Machine & Engineering Corp., Dover, OH (US)

( * ) Notice: Subject to any disclaimer, the term of this patent is extended or adjusted under 35 U.S.C. 154(b) by 0 days.

(21) Appl. No.: 10/740,904

(22) Filed: Dec. 19, 2003

(65) Prior Publication Data

US 2005/0135888 A1 Jun. 23, 2005

(51) Int. Cl.
*B23B 51/00* (2006.01)

(52) U.S. Cl. ............................... 408/230; 408/713

(58) Field of Classification Search ............ 408/713, 408/227, 230, 233, 144; *B23B 51/00*
See application file for complete search history.

(56) References Cited

U.S. PATENT DOCUMENTS

| | | | |
|---|---|---|---|
| 1,221,247 A | 4/1917 | Traylor | |
| 4,744,704 A * | 5/1988 | Galvefors | 408/144 |
| 4,950,108 A * | 8/1990 | Roos | 408/59 |
| 5,312,209 A * | 5/1994 | Lindblom | 408/230 |
| 5,423,640 A * | 6/1995 | Lindblom et al. | 408/230 |
| 5,452,971 A * | 9/1995 | Nevills | 408/230 |
| 5,599,145 A * | 2/1997 | Reinauer et al. | 408/233 |
| 5,904,455 A * | 5/1999 | Krenzer et al. | 408/144 |
| 5,957,631 A | 9/1999 | Hecht | |
| 5,971,673 A | 10/1999 | Berglund et al. | |
| 5,988,953 A | 11/1999 | Berglund et al. | |
| 6,012,881 A | 1/2000 | Scheer | |
| 6,481,938 B1 | 11/2002 | Widin | |
| 6,514,019 B1 * | 2/2003 | Schulz | 408/59 |
| 6,551,036 B1 * | 4/2003 | Heule | 408/227 |
| 6,565,296 B1 * | 5/2003 | McKinley et al. | 408/224 |
| 6,685,402 B1 * | 2/2004 | Mast et al. | 408/227 |
| 2001/0031182 A1 * | 10/2001 | Widin | 408/230 |

FOREIGN PATENT DOCUMENTS

| | | | |
|---|---|---|---|
| GB | 550306 | * | 1/1942 |
| GB | 550306 | | 1/1943 |

OTHER PUBLICATIONS

Yestool, Printout from Yestool Website, 3 pages.

* cited by examiner

*Primary Examiner*—Monica Carter
*Assistant Examiner*—J Williams
(74) *Attorney, Agent, or Firm*—Hahn Loeser & Parks, LLP; Robert J. Clark

(57) ABSTRACT

A cutting tool insert and holder therefore, the drill insert having a helical geometry corresponding to helical flutes in a drill body holder which enable the drill tool assembly to more efficiently remove chips from a hole during operation, the drill insert comprising a drill insert body having a first end opposite a second end, a plurality of helical flutes formed in the drill insert body, a plurality of cutting edges formed at the interfaces of the plurality of helical flutes and the first end of the drill insert body, and an aperture formed in each helical flute.

23 Claims, 7 Drawing Sheets

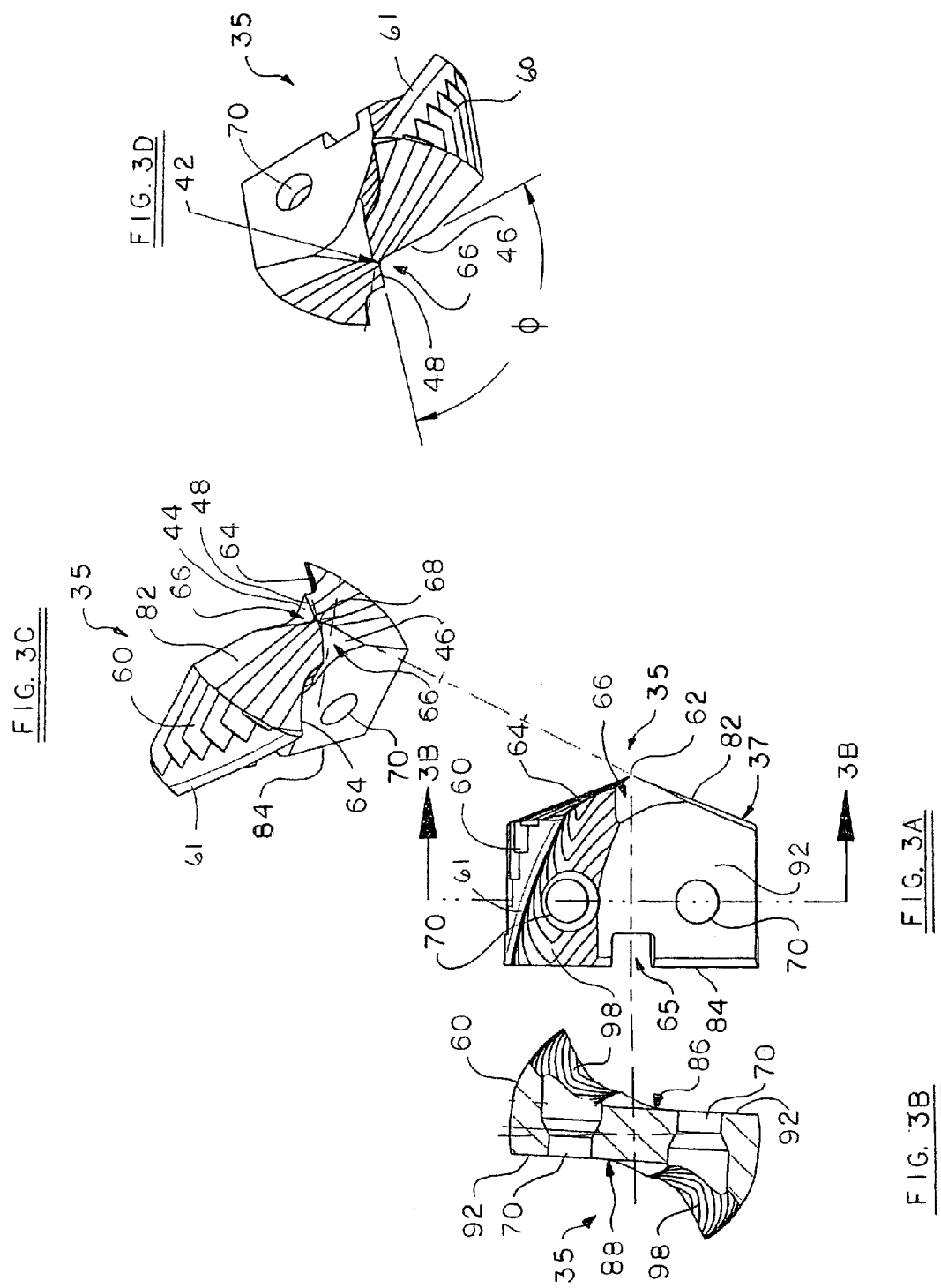

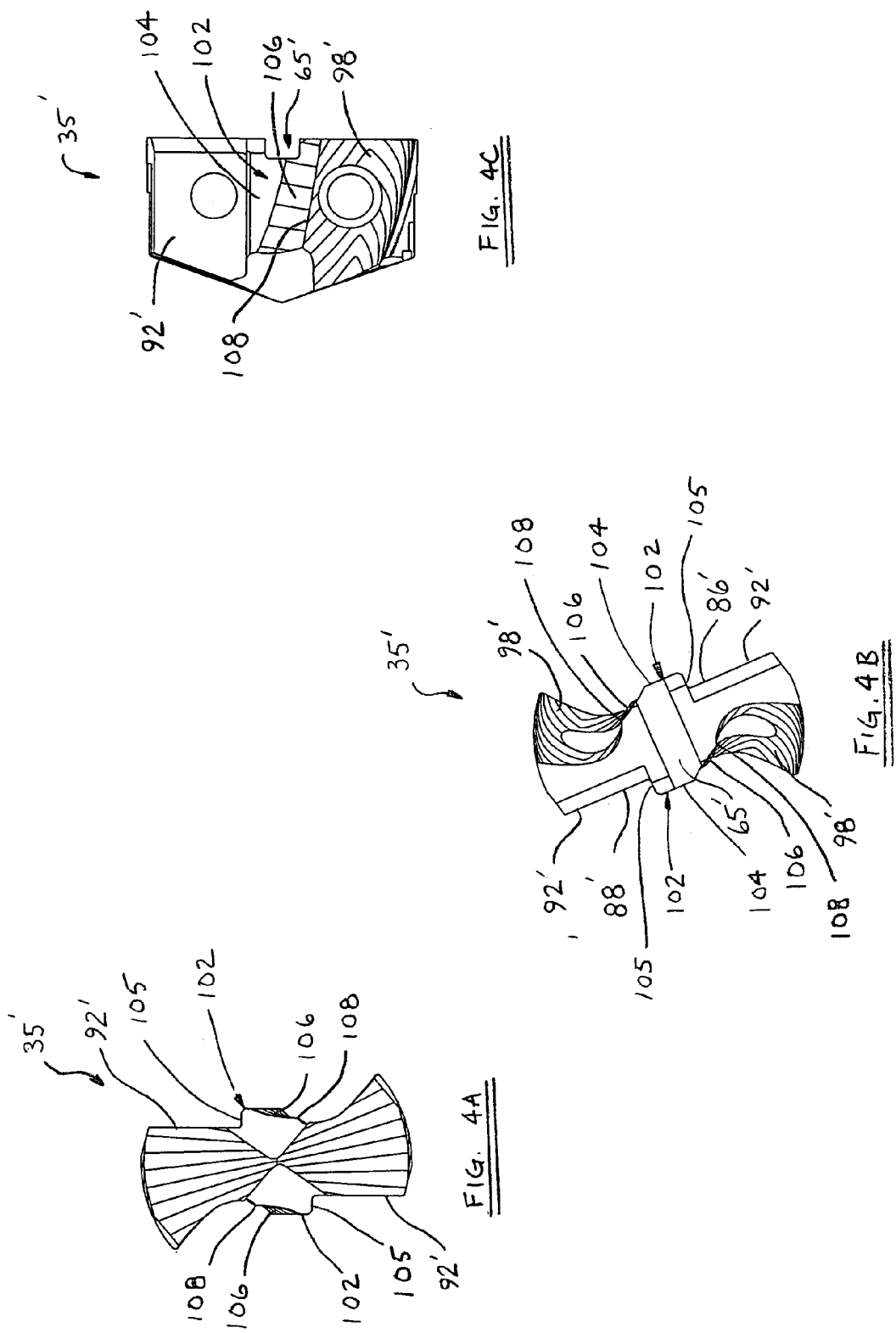

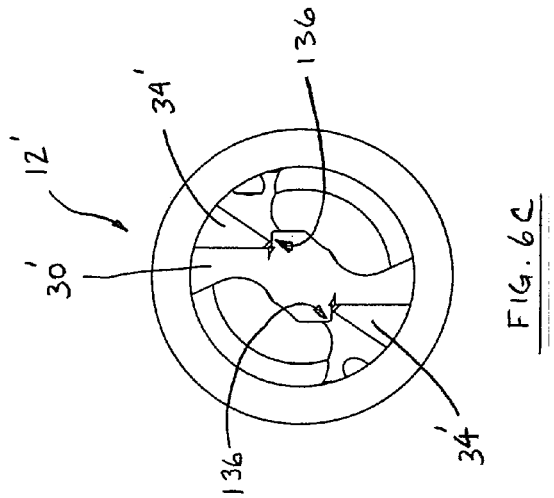
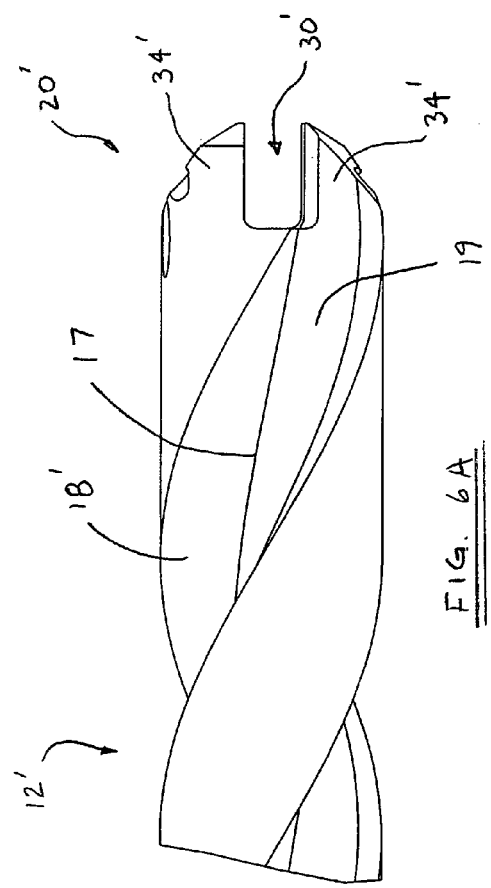
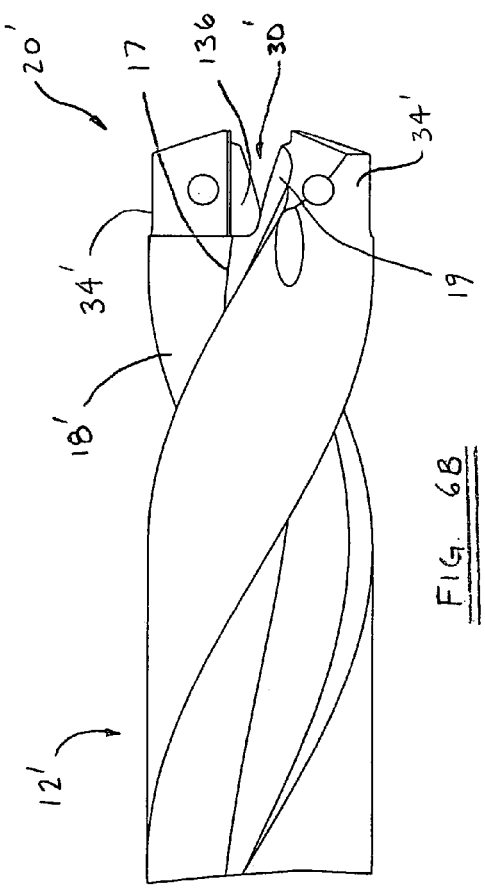

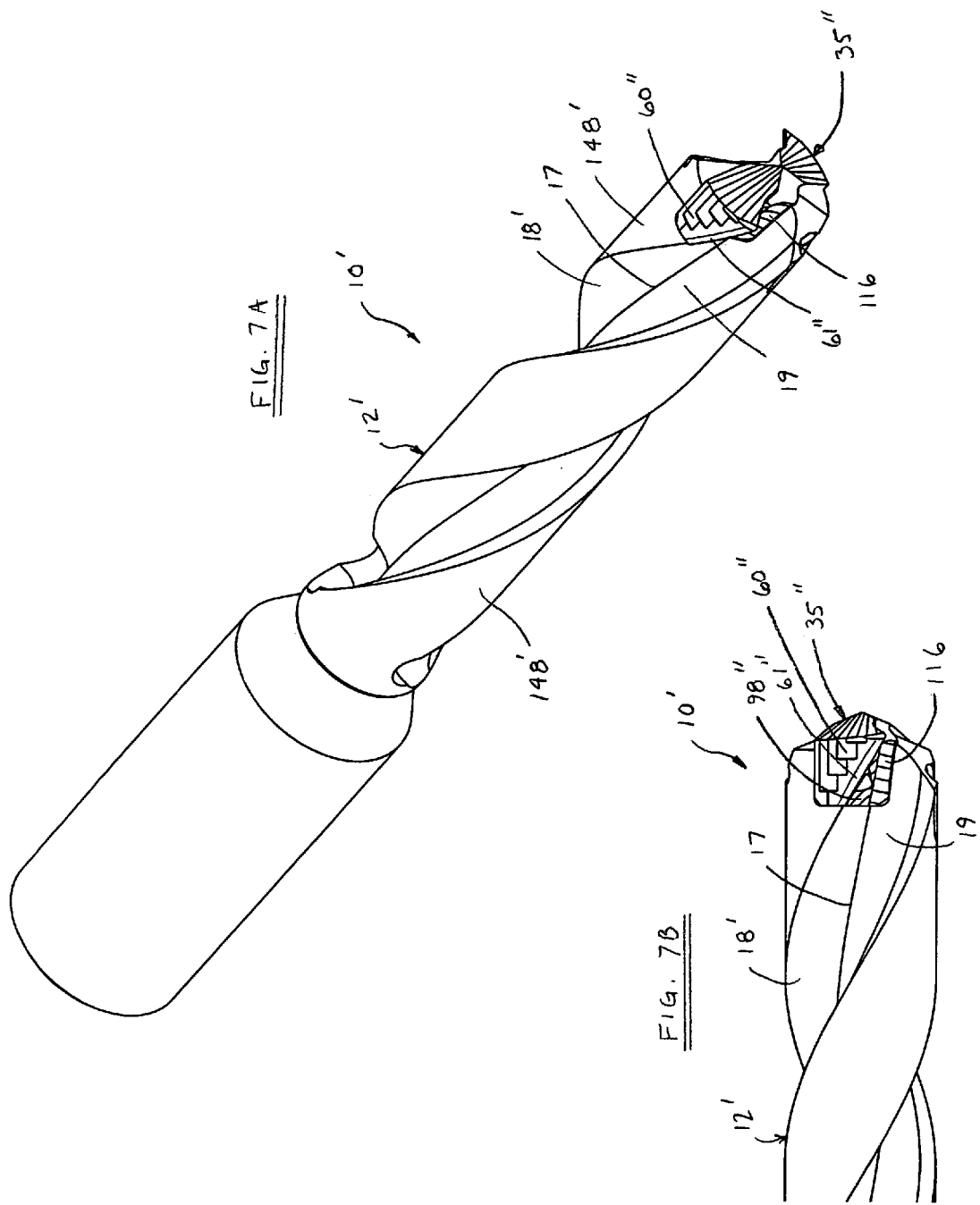

CUTTING INSERT WITH HELICAL GEOMETRY AND HOLDER THEREFOR

TECHNICAL FIELD

The invention relates generally to a cutting insert to be placed into a tool holder for boring holes into metals. More specifically, the invention relates to a cutting tool insert having a helical geometry corresponding to helical flutes in a drill body holder which enables the drill tool assembly to more efficiently remove chips from a hole during operation.

BACKGROUND OF THE INVENTION

Drilling systems are frequently used to provide cylindrical holes in metallic workpieces. The cutting or boring action of the drill system may be carried out by an elongated, substantially cylindrical drilling tool, such as a combination of a tool holder and a drill insert, which is selectively attached thereto such as the type commonly referred to as a spade-type drill. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, the tool and workpiece may be made to rotate relative to one another. The use of cutting inserts allows for quick changing of the insert upon wear of the cutting surfaces instead of the entire tool, and allows for one tool to be used for a variety of different boring applications by simply changing the insert and not the entire drill assembly.

One problem with prior art spade-type cutting tools is that insert is typically configured as a flat blade and the holder is configured with a straight flute. Even when used with flush channels through the holder, these types of drill assemblies are best suited for drilling shallow holes at relatively slower speeds due to their poor chip removal. Helical flutes are provided in typical twist drills to help in chip removal. Large helix angled flutes (often 20 degrees or above) are used for effective chip removal at high drilling speeds.

Attempts have been made in the prior art to combine the versatility and cost-effectiveness of the spade-type insert and holder with the benefits of helical flutes, however, these efforts have resulted in complex or inadequate blade retaining systems as well as complex shaped blades which negate the cost benefits of the replaceable blade insert. Other prior art attempts have combined a helical flute with a portion of a straight flute at the drill insert connection end in order to accommodate a flat drill insert. However in terms of chip removal, improved performance can be obtained if the helical flute is adjacent the cutting edges. In this prior art configuration, the chips are first transported by a straight portion resulting in loss of efficiency in removing chips and forcing a slower cutting speed for the tool. In addition, the straight cutting edge of the flat cutting blade does not typically dissipate heat as well as a curved cutting edge. If the point does not adequately conduct heat away from its cutting edges, the temperature buildup will "burn" the point and diminish the life of the drill bit. The heat generated at the lip of the drill point is directly related to the load and stresses the lip is subjected to. The more efficiently load stresses are dissipated, the less heat is built up at the cutting edge of the drill point.

Some prior art inserts have been developed with radially curved cutting edges. However, these prior art inserts are apt to direct chips directly into the clamp arms of the holder during operation of the tool. The clamp arms and the holder are made of a steel material that is significantly softer than the hard carbide material typically used to manufacture the drill insert. The chips impacting against the clamp arms erode and wear the clamp arms. This chip erosion of the clamp arms significantly reduces the life of the holder.

Therefore, there remains a need in the art for a drill insert tool that overcomes one or more or the disadvantages identified in the prior art.

SUMMARY OF THE INVENTION

It is an object of the invention to provide an improved spade drill. These and other advantages are provided by a drill insert comprising a drill insert body having a first end opposite a second end, a plurality of helical flutes formed in the drill insert body and extending axially from the first end to the second end, a plurality of curved cutting edges formed at the interfaces of the plurality of helical flutes and the first end of the drill insert body, and wherein the drill insert body includes at least two apertures, each aperture positioned through each helical flute and extending through the drill insert body to a generally planar attachment surface on an opposite side of the drill insert body.

These and other objects of the invention are also provided by a drilling tool assembly comprising a holder having a first end, a second end, and a cylindrical drill portion between the first end and the second end, wherein the second end comprises a shank portion adapted to be fixedly attached in a drilling machine, wherein the first end comprises a holder slot having a bottom seating surface over at least a portion of the holder slot and at least one attachment arm positioned on each side of the holder slot, wherein each attachment arm has at least one aperture formed therein, and wherein the cylindrical drill portion has a first plurality of helical flutes formed therein, a drill insert comprising a drill insert body having a first drill insert end opposite a second drill insert end, a second plurality of helical flutes formed in the drill insert body and extending axially from the first drill insert end to the second drill insert end; a plurality of curved cutting edges formed at the interfaces of the second plurality of helical flutes and the first drill insert end of the drill insert body; and wherein the drill insert body includes at least two apertures, each aperture positioned through each helical flute and extending through the drill insert body to a generally planar attachment surface on an opposite side of the drill insert body, wherein the drill insert is removably secured to the holder by at least two fasteners, each fastener positioned through each helical flute of the second plurality of flutes and extending through the drill insert body into the aperture formed in each attachment arm of the holder.

BRIEF DESCRIPTION OF THE DRAWINGS

The invention and developments thereof are described in more detail in the following by way of embodiments with reference to the drawings, in which:

FIGS. 3A–3D are a variety of different views of an insert according to an embodiment of the present invention having flutes thereon;

FIGS. 4A–4C are a variety of different views of an insert according to another embodiment of the present invention having a boss projecting radially outward from each face side thereof;

FIGS. 6A–6C are a variety of different views of a holder end used with the insert of FIGS. 5A–5C; and FIGS. 7A–7B are a variety of different views of an assembled drill tool assembly using the insert of FIGS. 5A–5C and the holder of FIGS. 6A–6C.

DETAILED DESCRIPTION OF THE INVENTION

Figure 1:
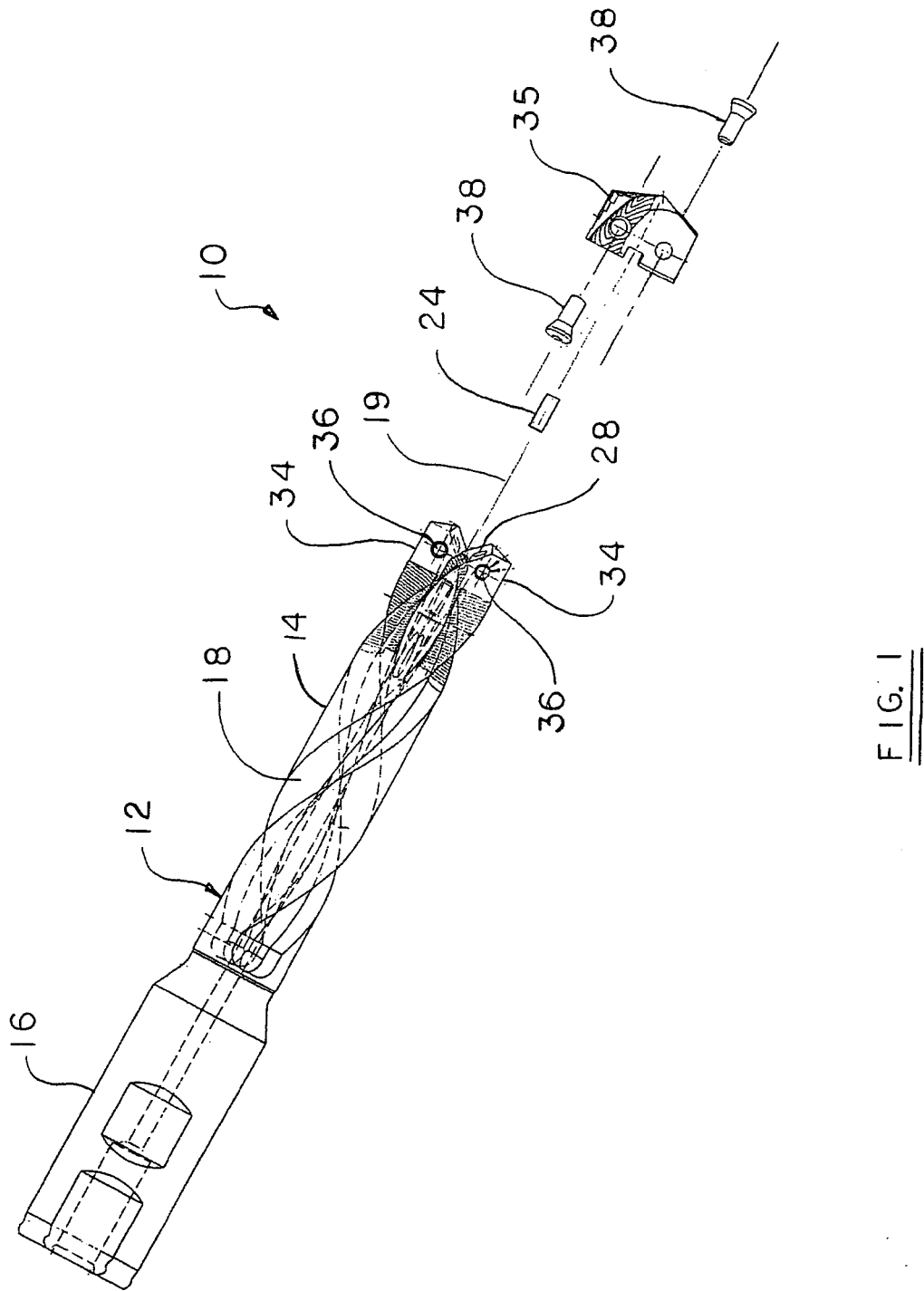
FIG. 1 is an exploded assembly view of the drill tool assembly according to a preferred embodiment.
Figure 2:
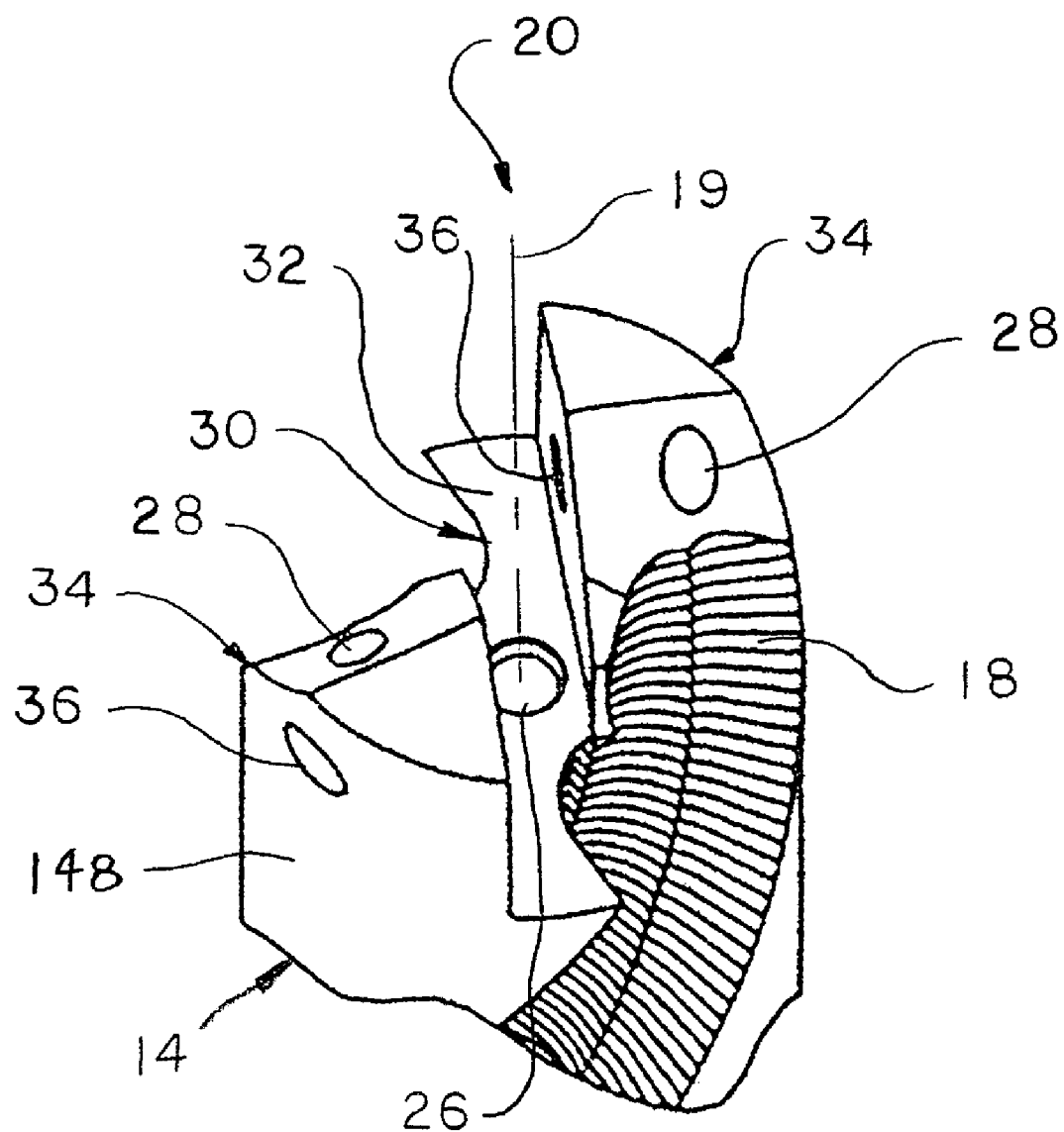
FIG. 2 is a partial perspective view of the holder end associated with the assembly.

Turning now to an embodiment of the invention, FIG. 1 illustrates a drill tool assembly 10 generally indicated in an exploded view. Drill tool assembly 10 comprises a holder 12, which has a drill body 14 and shank 16 associated therewith. The body 14 comprises a pair of helical flutes 18 formed therein. Holder 12 has, in general, a cylindrical shape with a holder end 20 opposite the shank 16 which is configured to securely support a drill insert 35. As shown in FIG. 2, the holder end 20 has a clamping or holder slot 30, which may extend across the entire diameter of the holder end 20 or, at least, over a center portion thereof at the general location of the rotational axis 19 of holder 12. The holder slot 30 has a bottom wall 32 positioned in substantially perpendicular orientation relative to the rotational axis 19 of the holder 12. In one embodiment, the assembly 10 may further include a locating boss or dowel pin 24 (see FIG. 1), which is positioned precisely with respect to the axis 19 and extends from the bottom wall 32 of the holder slot 30. The pin 24 may be positioned within a hole 26 extending downwardly from the bottom wall 32 of slot 30 along the axis 19 of the holder body in a press fit relationship to position pin 24. Alternatively, the locating boss or pin 24, may be configured in another manner to achieve the corresponding functionality of pin 24, such as an integral member extending from bottom wall 32. Referring again to FIG. 1, within the holder slot 30, a drill insert 35 is precisely positioned with respect to the holder 12 to perform the desired drilling function in conjunction therewith. As will be hereinafter described in more detail, the insert 35 has a point geometry comprising a plurality of cutting surfaces, which are precisely positioned with respect to the axis 19 of the holder 12 to result in more efficient drilling operations using assembly 10.

More particularly, an embodiment of holder 12 is shown in FIG. 2, and may be configured to include at its holder end 20 a pair of attachment arms or clamping arms 34, which extend about holder slot 30. The clamping arms 34 preferably include apertures 36, which accommodate screws 38 (see FIG. 1) to secure the drill insert 35 in its position within the holder slot 30. In one embodiment, the holes 36 are threaded to engage screws 38, and mate with screw holes formed in the drill insert 35 in a predetermined manner to precisely locate the drill insert in a predetermined location within holder slot 30, as will be described in more detail. Each of the clamp arms 34 may also include a lubrication vent 28 or flush channels, which allows the application and flow of lubrication adjacent the cutting surfaces of the drill insert to facilitate the drilling operation. The clamp arms 34 may also include angled or curved surfaces forming part of the flutes 18 which facilitate chip removal on each side of the holder 12. The seating surface 32 is also shown generally as a planar surface. In the configuration shown, hole 26 is formed in the seating surface 32 of slot 30 along the axis 19 which will accommodate a locator pin 24 as discussed above.

Turning to FIGS. 3A–3D, an embodiment of the drill insert 35 is shown. The drill insert 35 may form a modified spade drill blade, with peripheral cylindrical side surfaces 60 of the blade being generally arcuate and having a center at the rotational axis 19 of the holder 12 once the insert 35 is positioned and secured with holder 12. When secured with holder 12, drill insert 35 will also have a rotational axis, which desirably is coaxial with axis 19 of holder 12. Drill insert 35 comprises a drill insert body 37 having a first end, or cutting end 82 opposite a second end, or support end 84, and a first face side 86 opposite a second face side 88. The support end 84 of the drill insert body 37 is a generally planar surface and the cutting end 82 has at least two curved cutting edges 64. Each face side 86, 88, comprises an attachment surface 92 and a helical flute 98. The attachment surfaces 92 are generally planar and parallel to each other, although not limited as such. The peripheral cylindrical side surfaces 60 may also include a helical margin 61 adjacent the helical flute 98. The drill insert body 37 includes at least two apertures 70, each aperture positioned through each helical flute 98 and extending through the drill insert body 37 to the attachment surface 92 of the opposite face side. The helical flutes 98 are formed at the same helix angle as that of flutes 18 of the holder and positioned to form a continuous flute when the drill insert is assembled on the holder 12. The fact that the flute 98 is adjacent the cutting edge 64 results in efficient and quick removal of chips. Accordingly, the helical flutes 98, 18 enable the drill tool assembly 10 to remove chips from a drilled hole efficiently and quickly, even at high drilling speeds. The cutting edges 64 are formed by the interface of the cutting end 82 and the helical flutes 98 of the insert 35 resulting in the advantage of a curved cutting edge which generally dissipates heat more effectively than a straight cutting edge as in typical spade-type blade inserts.

As previously mentioned, the drill insert 35 includes curved cutting edges 64 on its upper surface 82 on each side of the axial center 62, also known as the dead center. The cutting edges 64 may include a plurality of cutting components, which cooperate together to provide the desired cutting surface 64 for the material and/or drilling application. In general, the insert 35 is designed to cut when rotationally driven in conjunction with holder 12 in a predetermined direction, and is not reversible, although such drilling blade configurations are known to those skilled in the art and could be used in conjunction with the present invention if desired.

The drill insert apertures 70 are formed in helical flutes 98 and cooperate with the apertures 36 in clamp arms 34 to secure insert 35 within holder slot 30 and seated against seating surface 32. Additionally, apertures 70 are preferably formed with countersunk portions formed as a bearing surface adapted to be engaged by a corresponding tapered or like surface on the screws or other fastening mechanism 38. The enlarged clamping head of the screws 38 may be of any convenient shape, such as conical, ball-shaped, or in another form to correspond with the similar surfaces in the tool holder 12 and insert 35. In a typical fashion, by offsetting the axes of the apertures 36 and 70, upon securing insert 35 within slot 30 by means of screws 38, the insert 35 will be forced downwardly against the seating surface 32. Insert 35 may include a locating slot 65, which allows positioning of the locating pin 24 therein. This connection is further described in co-owned U.S. Pat. No. 5,957,635, which is herein incorporated by reference.

Insert 35 may also include a notch feature 66 as best shown in FIGS. 3A, 3C, and 3D. A notch 66 is located on either side of the chisel 68, which is formed across the insert web and extends through axial center 62. A negative feature of drill inserts and twist drills, in general, is that the chisel must act as a cutting edge. The chisel 68 has a negative rake angle, which does not cut efficiently but rather deforms the metal. This results in high thrust forces being required and excessive heat being developed at the point 62. The notch 66 forms a type of flute on either side of insert 35, which reduces the web and length of chisel 68. Prior art notches typically were formed as a full radius. The prior art notches provide a neutral cutting edge, which still does not efficiently cut but rather extrudes or deforms the metal. In the embodiment shown, the notch 66 is shaped like a "V" having a radiused trough 42 at the bottom of the notch 66 and a first generally planar side 44 on a leading side of trough 42 and a second generally planar side 46 on the opposite side, or trailing side of the trough 42, forming an angle φ. Like the prior art web-thinning techniques, the notch 66 also reduces the length of the cutting edges 64 as the leading side 44 of the notch 66 is cut into a portion of the cutting edge 64. However, the notch 66 of the present invention is formed such that the trough 42 of the notch 66 is at a skewed angle with respect to axis 19 such that the leading edge 44 of the notch 66 forms a positive rake angle cutting edge 48. Such a notch is disclosed in co-owned, co-pending U.S. patent application Ser. No. 09/975,221, filed Oct. 11, 2001, and hereby incorporated by reference. Therefore, the notch 66 actually extends the effective positive rake angle cutting edge length of drill tool assembly 10. The multiple cutting edges 64, 48, aggressively bite into the material to be drilled as the drill tool assembly 10 rotates. Additionally, the positive rake angle cutting edge 48 results in enhanced self-centering of the drill tool assembly 10 by providing an aggressive geometry which bites into the material near the chisel 68. The negative or neutral prior art web thinning techniques allowed the drill point to "walk" along the surface of the material to be cut, thus moving the drill away from the desired location, or resulted in bell-mouthing of the drill hole entrance.

Referring now to FIGS. 4A–4C, another embodiment of a drill insert 35' is shown. Drill insert 35' differs from insert 35 of the previous embodiment in that drill insert 35' includes a boss 102 projecting radially outward from the central portion of each face side 86', 88'. Each boss 102 may have a radially outermost surface 104 which may be parallel with the surface 104 on the opposite face side. The boss 102 comprises a first surface 105 extending transverse to the attachment surface 92' and may be formed either parallel or transverse to the rotational axis of the insert 35'. The extension of the bosses 102 allows the formation of a second helical flute portion 106 on the drill insert 35'. The second helical flute portion 106 is formed adjacent the drill insert helical flute 98' and separated therefrom by a ridge 108. The second helical flute 106 in combination with helical flute 98' provides a wider flute and allows more curl in the chip formation during operation of the drill insert 35'. Ridge 108 between the two flutes 98', 106, acts as a chipbreaker. As the chip is formed along the leading helical flute 98', the ridge 108 causes the chip to break, resulting in smaller chips which are more easily removed from the hole during operation of the drill insert 35'. Another benefit of the boss 102 is that it protects the clamp arms of the holder from chip erosion. The boss 102 shields a significant portion of the clamp arm. In addition, the second flute 106 directs the chip away from the clamp arms. Accordingly, the boss 102 feature of the drill insert 35' eliminates chip erosion and prolongs the life of the holder.

Figure 5C:
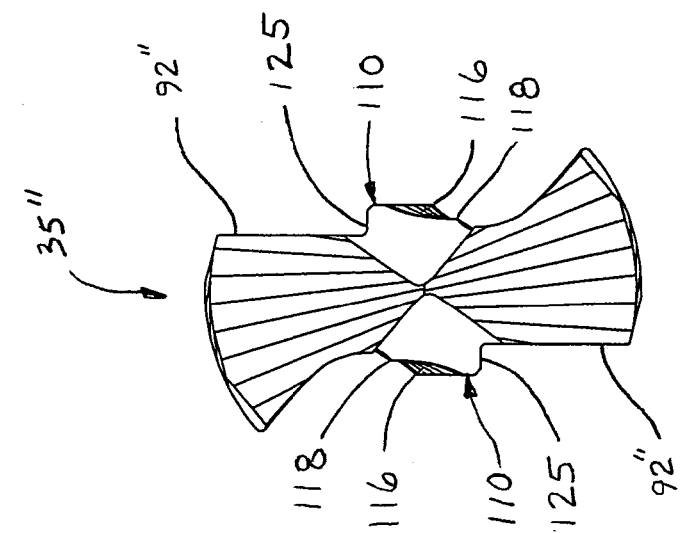
FIGS. 5A–5C are a variety of different views of an insert according to another embodiment of the present invention having a boss projecting radially outward from each face side thereof.
Figure 5B:
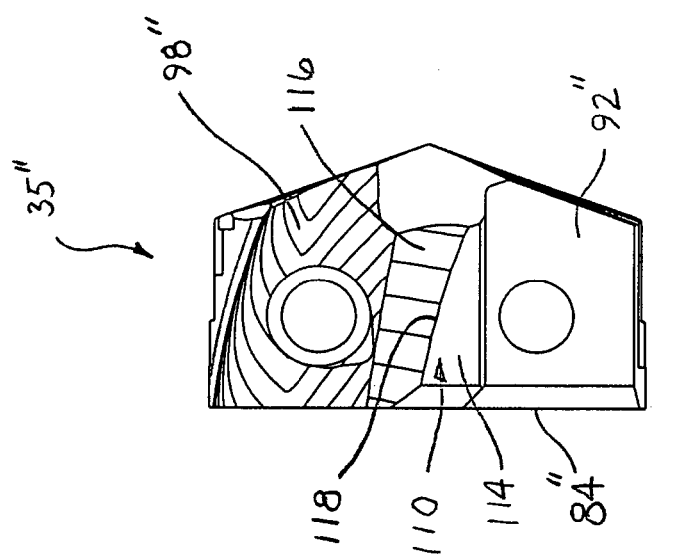
Figure 5A:
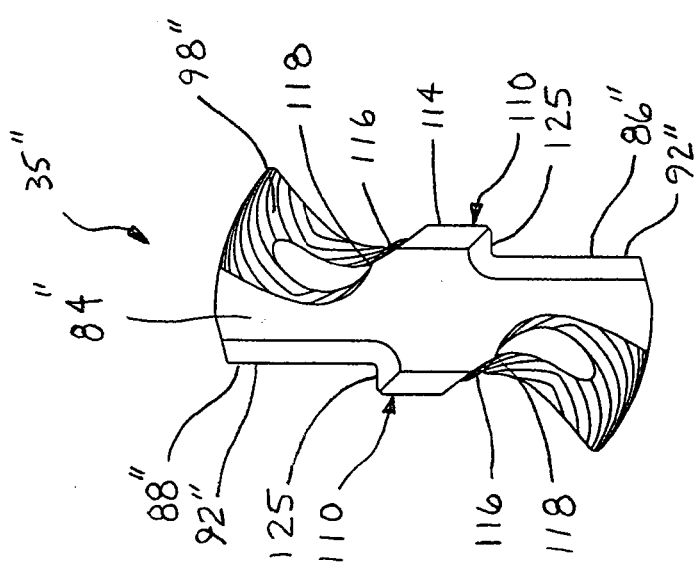

Still another embodiment of the drill insert of the present invention is shown in FIGS. 5A–5C. Insert 35" differs from insert 35' of the previous embodiment in that it does not have a locating slot in the planar surface of the second end 84" of the insert 35". In order to properly locate the drill insert 35" on the holder, the drill insert 35" comprises a locating boss 110 projecting radially outward from the central portion of each face side 86", 88". Similar to the previous embodiment, each boss 110 may have a radially outermost surface 114 which may be parallel with the surface 114 on the opposite face side. The boss 110 comprises a first locating surface 125 extending transverse to the attachment surface 92" and may be formed either parallel or transverse to the rotational axis of the insert 35". As with the previous embodiment, the extension of the bosses 110 allows the formation of a second helical flute portion 116 on the drill insert 35". The second helical flute portion 116 is formed adjacent the drill insert helical flute 98" and separated therefrom by a ridge 118. The second helical flute 116 in combination with helical flute 98" provides a wider flute and allows more curl in the chip formation during operation of the drill insert 35". Ridge 118 between the two flutes 98, 116, acts as a chipbreaker. As the chip is formed along the leading helical flute 98, the ridge 118 causes the chip to break, resulting in smaller chips which are more easily removed from the hole during operation of the drill insert 35". Another benefit of the boss 110 is that it protects the clamp arms 34' of the holder 12' from chip erosion.

Referring now to FIGS. 6A–6C, the holder 12' differs from holder 12 in the locating of the drill insert 35" on the holder 12'. Holder 12' comprises at its holder end 20' a pair of attachment arms 34', which extend about holder slot 30'. Each attachment arm 34' of the holder 12' includes a locating recess 136 formed therein corresponding to the locating boss 110 of the drill insert 35" in order to ensure that the drill insert 35" is properly located in the holder slot 30'. The holder 12' also comprises helical flutes 18' and a second helical flute 19 adjacent helical flutes 18' and separated therefrom by a ridge 17.

The drill tool assembly 10' is shown in FIGS. 7A–7B in an assembled state. The drill tool assembly 10' shows that the helical flutes 98", 116, of the insert 35" combines with the helical flutes 18', 19 of the holder 12' to form a continuous helical flute having generally the same helix angle and extending to the first end of the drill insert 35". The holder 12' also comprises a plurality of lands 148, each land 148 formed between the helical flutes 18' of the holder 12'. The peripheral cylindrical surface 60" of drill insert 35" forms a drill insert land portion generally corresponding to the lands 148' of the holder 12', such that the land 60" extends to the first end of the drill insert 35". The drill insert land portion 60" may comprise helical margin 61" formed on the leading end of the peripheral cylindrical surface adjacent an insert helical flute 98".

It is contemplated that the drill insert is made of a sintered metallic hard material such as carbide, cermet, ceramic, monocrystalline and polycrystalline diamond, or boron nitride. However, the drill insert may also be comprised of high speed steel.

Although the present invention has been described above in detail, the same is by way of illustration and example only and is not to be taken as a limitation on the present invention.

Accordingly, the scope and content of the present invention are to be defined only by the terms of the appended claims.

What is claimed is:

1. A drill insert comprising:
   a drill insert body having a first end opposite a second end;
   a first plurality of helical flutes formed in the drill insert body and extending axially from the first end to the second end inwardly relative to the thickness of the drill insert body and downwardly toward the second end;
   a plurality of curved cutting edges formed at the interfaces of the first plurality of helical flutes and the first end of the drill insert body, with the plurality of helical flutes extending to the curved cutting edges; and
   wherein the drill insert body includes at least two apertures, each aperture positioned through each helical flute of the first plurality of helical flutes and extending through the drill insert body to a generally planar attachment surface on an opposite side of the drill insert body.

2. The drill insert of claim 1, wherein the drill insert body further comprises a second plurality of helical flutes, each helical flute of the second plurality of helical flutes formed adjacent each helical flute of the first plurality of helical flutes.

3. The drill insert of claim 1, wherein the drill insert body further comprises a plurality of bosses, each boss extending radially from a central portion of the drill insert body.

4. The drill insert of claim 1, wherein the first end of the drill insert body further comprises
   a web formed between the cutting edges; and
   a web thinning notch formed on either side of the web;
   wherein each notch forms a notch cutting edge having a positive rake angle.

5. The drill insert of claim 4, wherein the web thinning notch is generally formed in a "V" shape.

6. The drill insert of claim 4, wherein the notch cutting edge is formed by at least one planar side wall of the notch.

7. The drill insert of claim 4, wherein each notch has a cross-sectional geometry in the form of a "V" having a radius at the apex of the notch and transitioning to substantially planar side walls.

8. The drill insert of claim 1, wherein the drill insert body further comprises a plurality of peripheral cylindrical surfaces, each surface forming a drill insert land portion.

9. The drill insert of claim 8, wherein each drill insert land portion comprises a helical margin formed on the leading end of the peripheral cylindrical surface adjacent a helical flute of the plurality of helical flutes.

10. The drill insert of claim 1, wherein the second end of the drill insert body is a generally planar surface having at least one locating recess formed therein.

11. The drill insert of claim 1, wherein the drill insert body further comprises a plurality of locating surfaces formed parallel to the rotational axis of the insert and formed transverse to each attachment surface of the drill insert body.

12. The drill insert of claim 1, wherein the drill insert body further comprises a plurality of locating surfaces formed transverse to the rotational axis of the insert and formed transverse to each attachment surface of the drill insert body.

13. The drill insert of claim 1, wherein the drill insert body is comprised of a sintered metallic hard material.

14. The drill insert of claim 1, wherein the drill insert body is comprised of a material selected from the group consisting of carbide, cermet, ceramic, monocrystalline and polycrystalline diamond, high speed steel, and boron nitride.

15. A drilling tool assembly comprising:
   a holder having a first end, a second end, and a cylindrical drill portion between the first end and the second end, wherein the second end comprises a shank portion adapted to be fixedly attached in a drilling machine, wherein the first end comprises a holder slot having a bottom seating surface over at least a portion of the holder slot and at least one attachment arm positioned on each side of the holder slot, wherein each attachment arm has at least one aperture formed therein, and wherein the cylindrical drill portion has a first plurality of helical flutes formed therein;
   a drill insert comprising a drill insert body having a first drill insert end opposite a second drill insert end, a first plurality of drill insert helical flutes formed in the drill insert body and extending axially from the first drill insert end to the second drill insert end inwardly relative to the thickness of the drill insert body and downwardly toward the second end; a plurality of curved cutting edges formed at the interfaces of the first plurality of drill insert helical flutes and the first drill insert end of the drill insert body, with the plurality of helical flutes extending to the curved cutting edges; and wherein the drill insert body includes at least two apertures, each aperture positioned through each drill insert helical flute and extending through the drill insert body to a generally planar attachment surface on an opposite side of the drill insert body;
   wherein the drill insert is removably secured to the holder by at least two fasteners, each fastener positioned through each drill insert helical flute of the first plurality of drill insert flutes and extending through the drill insert body into the aperture formed in each attachment arm of the holder.

16. The drill tool assembly of claim 15, wherein the each helical flute of the first plurality of flutes combines with a corresponding drill insert helical flute of the first plurality of drill insert flutes to form a single helical flute having generally the same helix angle.

17. The drill tool assembly of claim 15, wherein the drill insert body further comprises a second plurality of drill insert helical flutes, each drill insert helical flute of the second plurality of drill insert helical flutes formed adjacent each drill insert helical flute of the first plurality of drill insert helical flutes and wherein the holder further comprises a second plurality of helical flutes, each helical flute of the second plurality of helical flutes formed adjacent each helical flute of the first plurality of helical flutes.

18. The drill tool assembly of claim 15, wherein the drill insert body further comprises a plurality of locating bosses, each boss extending radially from a central portion of the drill insert body and engageable with a corresponding locating recess formed in each attachment arm of the holder.

19. The drill tool assembly of claim 15, wherein the holder has a plurality of lands, each land formed between the first plurality of helical flutes, and wherein the drill insert body further comprises a peripheral cylindrical surface forming a drill insert land portion generally corresponding to the lands of the holder, such that the land extends to the first end of the drill insert body.

20. The drill tool assembly of claim 15, further wherein the first end of the drill insert body comprises
   a web formed between the at least two cutting edges; and
   a web thinning notch formed on either side of the web;
   wherein each notch forms a notch cutting edge having a positive rake angle.

21. The drilling tool assembly of claim 15, wherein the holder slot includes a locating boss extending from the bottom seating surface and the first end of the drill insert body has at least one recess which cooperates with the locating boss of the bottom seating surface to allow the insert to be seated against the bottom seating surface.

22. The drilling tool assembly of claim 15, wherein the holder includes at least one flushing channel.

23. The drill tool assembly of claim 15, wherein the locating boss is a pin having first and second ends, wherein the first end is received in a bore formed in the holder slot, and the second end extends a predetermined distance from the bottom seating surface of the holder slot.

* * * * *